Jan. 15, 1957 V. H. HILDEBRANT 2,777,497
ABRASIVELY COATED ANTI-SKID COVER FOR TIRE CASINGS
Filed Feb. 9, 1952

INVENTOR.
Vernon H. Hildebrant
BY
J. Warren Kinney Jr.
atty.

United States Patent Office 2,777,497
Patented Jan. 15, 1957

2,777,497

ABRASIVELY COATED ANTI-SKID COVER FOR TIRE CASINGS

Vernon H. Hildebrant, Morrow, Ohio

Application February 9, 1952, Serial No. 270,780

3 Claims. (Cl. 152—175)

This invention relates to anti-skid devices, and more particularly to an anti-skid device in the form of a continuous, elastic cover mountable over the traction portion of a standard tire casing.

An object of the invention is to provide an anti-skid device which may be quickly associated with a vehicular tire for materially increasing the traction qualities thereof.

Another object of the invention is to provide a cover for a vehicular tire casing wherein the inner surface of the cover is smooth and the outer surface is provided with abrasive, anti-skid particles permanently imbedded therein or secured thereto.

A further object of the invention is to provide an anti-skid cover member for a tire casing which is fabricated from a single, continuous piece of elastic, resilient material, such as rubber, and which is adapted to be securely though removably associated with a vehicular tire casing solely by reason of its elastic characteristics.

Another object of the invention is to provide an anti-skid cover for a vehicular tire casing which is lightweight, inexpensive, and characterized by the ease with which it may be secured to or removed from a tire casing.

Still another object of the invention is to provide an anti-skid cover for a vehicular tire casing which may be utilized for normal driving conditions as well as during those periods of time when skidding is prevalent, said cover member, when associated with a tire casing, being practically indistinguishable thereon and characterized by its quietness of operation.

These and other objects are attained by the means described herein and as disclosed in the accompanying drawings, in which.

With reference now to the drawings, the numeral 10 denotes generally an anti-skid, elastic cover member fabricated from resilient material, such as, by way of example, thin rubber similar to the rubber from which inner tubes are presently fabricated.

The cover comprises a continuous, annular central portion 12 and continuous, annular marginal portions 14 at opposite sides of and integral with the central portion.

Figure 1:
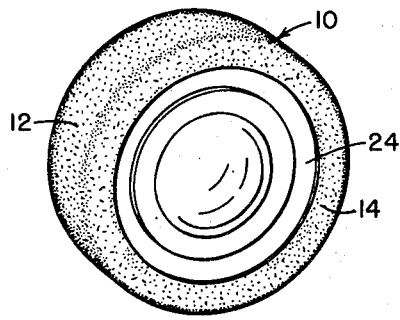
Fig. 1 is a perspective view of a vehicular wheel, the tire casing of which has been provided with an anti-skid cover member embodying the teachings of the present invention.
Figure 2:
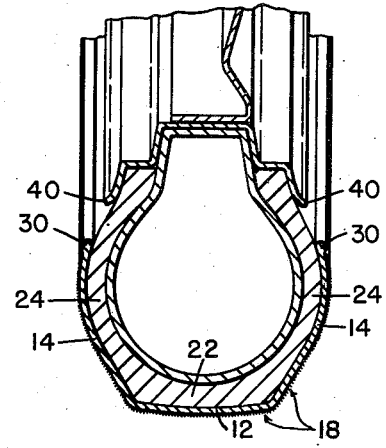
Fig. 2 is a vertical section through the wheel of Fig. 1, showing the relationship of the various parts.
Figure 3:
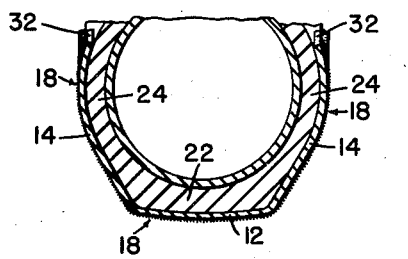
Figs. 3 and 4 are views, somewhat similar to the lower portion of Fig. 2, illustrating the various modifications of the anti-skid cover member.
Figure 4:
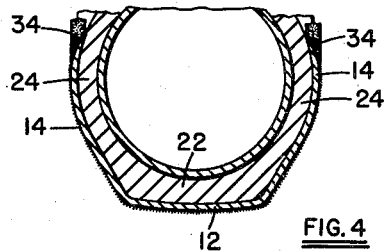
Figure 5:
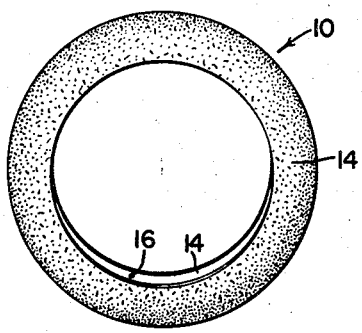
Fig. 5 is a perspective view of the anti-skid cover member, per se.

As best illustrated in Figs. 1 and 5, the cover member is continuous, and as illustrated in Figs. 2, 3 and 4, in cross section it is substantially U-shaped. The inner surface 16 of the central and marginal portions may be substantially smooth, whereas the outer portions of these surfaces are provided with an abrasive 18.

The present invention is neither directed to nor concerned with the particular means used for providing the outer abrasive surface, it being understood that such a surface may be provided, by way of example, by means of the teachings of the W. H. Sayre Patent No. 1,330,988 dated February 17, 1920; C. G. Fisher Patent No. 1,978,301 dated October 23, 1934, or R. Stahl Patent No. 2,084,784, dated June 22, 1937.

It should be understood that the peripheral dimensions of the central and marginal portions are preferably less than the corresponding dimensions of the outer casing of a vehicular tire whereby the cover must be stretched over the tire casing for disposing the central portion 12 directly beneath the central tread 22 and for locating the marginal portions 14 in overlapping relationship with side portions 24 of the casing.

I have found that my cover will tenaciously adhere to a tire casing when secured thereon solely by reason of its elastic engagement therewith even though the inner face of the central and marginal portions are smooth.

My cover member, when associated with a standard tire casing, is practically indistinguishable from the casing and by reason of its inherent elastic characteristics its central and marginal portions will snugly adhere to complementary portions of the casing, thereby enabling the cover member to be used even during those periods of time when the roadways are not icy.

In Fig. 2 I have illustrated a cover member wherein the free outer edge of the marginal portions is defined by a continuous, annular bead 30. In Fig. 3 the outer edge of the marginal portions merely terminates in edge 32, whereas in Fig. 4 the outer edge of the marginal portions is tapered as at 34 for forming a feathered edge and thus enabling this edge to tightly adhere to portion 24 of the tire casing.

In all modifications of my cover, the free peripheral edge of the marginal portions 14 terminates short of rim 40, in other words, my cover member is secured, by friction, directly to the tire casing and not to any parts or portions of the rim or wheel to which the casing is mounted.

It should be understood that various changes and modifications may be made in the structural details of the device within the scope of the appended claims without departing from the spirit of the invention.

What is claimed is:

1. An anti-skid cover for a tire casing, said cover being of ring-like form generally U-shaped in cross section having a tread portion and side wall portions integral therewith, and being formed entirely of relatively thin, flexible, elastic, rubber strip material, said cover having an abrasive outer surface formed by incorporating abrasive material in said tread and side wall portions, said cover being of dimensions circumferentially and transversely less than the circumferential and transverse dimensions of the fully expanded tire casing, the side wall portions of the cover being of less width than the width of the side wall portions of the tire casing, said cover being readily stretchable as a unit over the fully expanded tire casing when the latter is seated on a rim mounted on a wheel, the tread portion and side wall portions of said cover throughout the entire area of the same tightly and constantly embracing by contraction the surfaces of the tread portion and side wall portions of the tire casing when the cover is applied thereto so as to resist any movement of the cover relative to the tire casing when the tire casing is in actual use on a roadway, the marginal edges of the side wall portions of the cover being provided with integral means to enhance the embracing action of the edges with the side walls of the tire, said marginal edges being substantially uniformly spaced radially outwardly from the beads of the tire casing, the cover being securely but removably held on the tire casing solely by reason of its elasticity and constant contracting frictional engagement therewith.

2. An anti-skid cover for a tire casing as defined in claim 1 wherein the said integral means at the marginal edge of each side wall portion of the cover comprises a slightly thickened annular bead.

3. An anti-skid cover for the tire casing as defined by claim 1 wherein the said integral means at the marginal edge of each side wall portion of the cover comprises a feathered edge.

References Cited in the file of this patent

UNITED STATES PATENTS

| | | |
|---|---|---|
| 871,575 | Dorgan | Nov. 19, 1907 |
| 1,015,700 | Mosso et al. | Jan. 23, 1912 |
| 1,175,624 | Fawkes | Mar. 14, 1916 |
| 1,182,669 | Flaherty | May 9, 1916 |
| 1,330,988 | Sayre | Feb. 17, 1920 |
| 1,710,808 | Borman | Apr. 30, 1929 |
| 1,930,585 | Covey | Oct. 17, 1933 |
| 2,070,819 | Zerk | Feb. 16, 1937 |
| 2,682,907 | Krueger | July 6, 1954 |